April 1, 1947.  F. McCULLOUGH  2,418,234
DRILL JIG
Filed Oct. 9, 1944
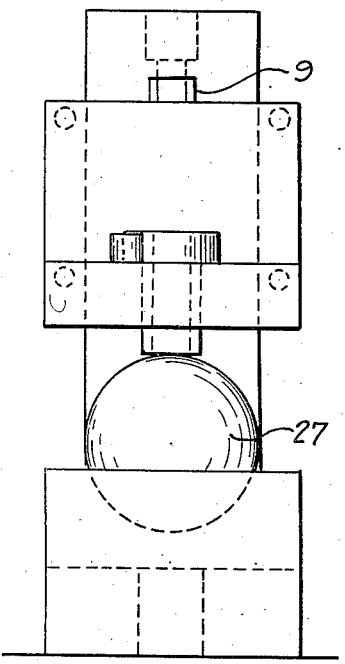
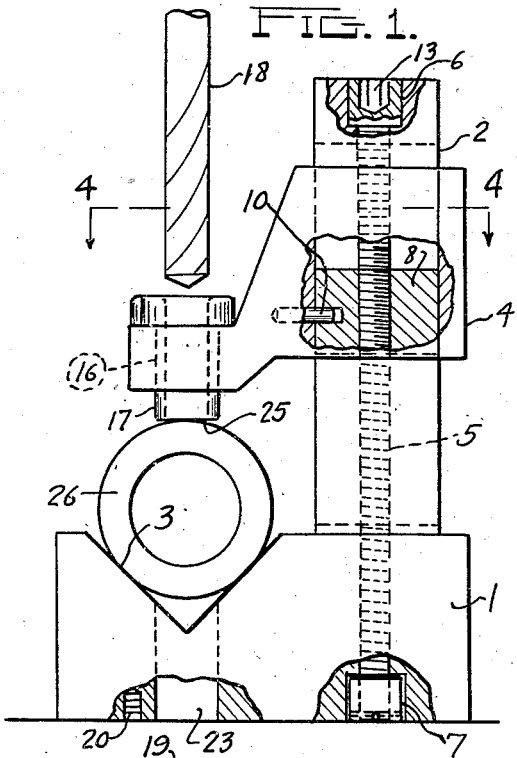
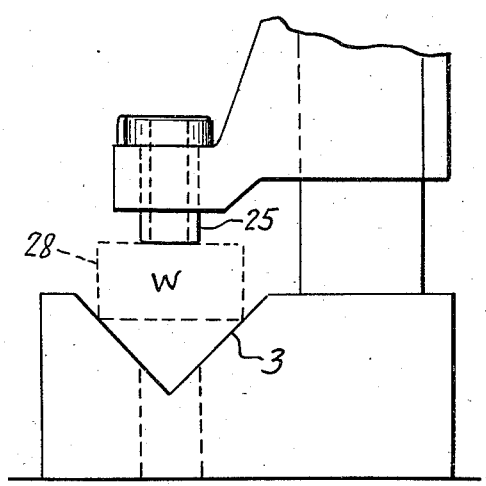
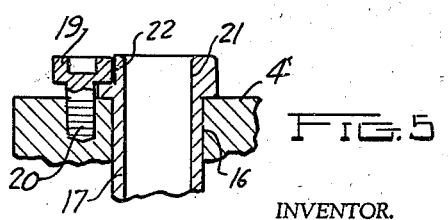
INVENTOR.
Frank McCullough Patented Apr. 1, 1947

2,418,234

UNITED STATES PATENT OFFICE 2,418,234

DRILL JIG

Frank McCullough, Detroit, Mich.

Application October 9, 1944, Serial No. 557,799

3 Claims. (Cl. 77—62)

This invention relates to a drill jig.

It is the object of this invention to produce a jig for holding work pieces to be drilled which is simple in structure, efficient in operation, and which is capable of holding and locating many different parts having many different contours so that they will be drilled accurately.

My invention contemplates a drill fixture which is separate from the drill so that it can be used right side up or positioned on its side while drilling, dependent upon the nature of the hole to be drilled. My drill fixture is also suitable for machine repair men or maintenance where accurate hand drilling is necessary.

My drill jig is also admirably adapted for accurately drilling completely through the diameters of such parts as balls and rings which have quite different contours.

Fig. 1 is a side elevation showing my drill jig.

Fig. 2 is a front elevation of the same.

Fig. 3 is a partial side elevation showing the work in position.

Fig. 4 is a section along the line 4—4 of Fig. 1.

Fig. 5 is a section along the line 5—5 of Fig. 4.

My fixture comprises a base 1 having an integral upright post 2. The base 1 is provided with a V shaped seat 3 for the work which serves as the stationary jaw of the fixture. Movable jaw 4 is slidably mounted on the post 2. A screw 5 is journalled at its upper end in post 2 as at 6 and at its lower end in bearing 7 within base 1. The screw has a threaded fit with nut 8 which has a nice sliding fit within the guideway 9 of post 2. The jaw 4 has a nice machine sliding fit on post 2.

The drive between nut 8 and jaw 4 is effected through a shear pin 10 of a soft or shearable material such as brass. Nut 8 is provided with a hole 11 and jaw 4 is provided with a hole 12. The shear pin 10 has a tight fit in openings 11 and 12 so that there will be no lost motion or play between driving nut 8 and the jaw 4. Pin 10, however, is removable from openings 11 and 12. Screw 5 is provided with a socket 13 at its upper end for an Allen wrench by means of which screw 5 can be turned to raise or lower jaw 4. The object of the shear pin 10 is that of preventing the operator from turning the jaw 4 down on the work with such force as to damage either the work or the fixture, and in particular to prevent the operator from stripping the thread on screw 5 or in the internally threaded nut 8 or screws 15 or 19.

The jaw 4 is retained on post 2 by means of a removable plate 14 which is secured in place by four Allen screws 15. When plate 14 is removed from jaw 4, jaw 4 can be slid off of post 2 by movement toward the left, Figs. 1 and 4, which disengages shear pin 10 from one or the other of openings 11 and 12 so that the shear pin 10 can be replaced whenever desired, and particularly when it has been sheared off due to overloading of the screw 5. The drill jig is arranged to accommodate drills of different diameters. Accordingly jaw 4 is provided with a large opening 16 which is arranged to receive a headed bushing 17 which serves as a guide for the drill 18.

Each fixture will be provided with a plurality of bushings 17 all having the same outer diameter but having different internal diameters. The size bushing 17 which will be mounted in opening 16 in jaw 4 will depend upon the diameter of the drill 18 which is to be used in the drilling operation. Bushings 17 are retained in position in opening 16 by means of an Allen screw 19 which screws into a threaded bore 20 in jaw 4, Fig. 5. The shoulder 21 of bushing 17 is relieved as at 22 to receive the head of the Allen screw 19. Bushing 17 has a nice sliding fit in opening 16.

The base 1 is provided with a bore 23 which is centered or accurately aligned with bore 16 in jaw 4.

In use the jaw 4 will be elevated so that the work can be positioned in the V groove 3 by moving the work in from the left hand side of the fixture, as shown in Fig. 1, or by moving the work in to the groove 3 in a direction parallel to the longitudinal axis of the groove. After the size of the bushing 17 has been selected to conform to the diameter of the drill 18, the bushing is slipped into opening 16 and secured in place by the Allen cap screw 19. Therafter the jaw 4 is turned down. The lower face 25 of bushing 17 is accurately machined so that it is located in a plane perpendicular to the axis of the bushing. As shown in Fig. 1, the work piece is a ring or cylinder.

As jaw 4 is turned down face 25 of the bushing contacts the ring 26 and cooperates with the sides of seat 3 to accurately locate the work piece 26 and to tightly clamp the ring 26 in position. The drill 18 is now passed through bushing 17 and the hole is drilled completely through the diameter of ring 26. If the work piece is a ball or sphere, such as shown at 27 in Fig. 2, it will be seen that the bushing 17 will make a circular contact with the top of the ball 27 and the ball will make a two-point contact with the V seat 3 so as to accurately position the ball in the fixture and insure drilling accurately through the full diameter of the sphere. If the work piece is a rectangular sided block 28, the flat face 25 of the bushing will contact the upper face of the block 28 and the two lower corners of the block will make line contacts with the seat 3 so that as the jaw 4 is turned down the block 28 will be clamped in place and positively located so that the drill will bore a hole in or through block 28 perpendicular to, and centrally of, its upper face.

When a work piece, such, for example, as a ring 26, is drilled by hand, the workman will drill through the top bushing 17 to drill the hole in the top of ring 26 and will then drill upwardly through opening 23 to drill a hole in the bottom of the ring. A bushing such as bushing 17 will, of course, be used in opening 23 to guide the drill. This manner of drilling will assure alignment of the holes in the top and bottom of work piece 26. If the cylinder 26 were drilled completely through the top and bottom by hand drilling through the top bushing 17 only, then the bottom hole would most likely be out of line with the top drilled hole because of the inability to maintain the alignment during hand drilling.

Thus it will be seen from the above that I have produced a drill fixture that clamps the work above and completely around the hole to be drilled and that is capable of automatically locating and centering work pieces of all general types, including balls, so that they will be drilled accurately. It is also evident that I have produced a drill fixture which, owing to the shear pin connection between the screw drive and the movable jaw, will not injure the work due to an excess clamping pressure and, which will not, for the same reason, damage the fixture itself.

My drill fixture is also highly useful for accurate drilling where the work piece has to be drilled from opposite sides for any reason.

I claim:

1. A drill jig comprising a jaw having a seat for the work to be drilled, a post, a second jaw slidable along said post, a screw journalled in said post, a nut slidable in said post having a threaded engagement with said screw, and a shearable driving connection between the nut and the movable jaw whereby when the fixture is overloaded the connection will shear and thereby avoid injury to the fixture or work.

2. The combination as set forth in claim 1 wherein the shearable connection comprises a shear pin located in adjoining openings in the driving nut and the driven jaw.

3. A drill jig comprising relatively movable jaws, one of said jaws having a V shaped seat for the work to be drilled, the other of said jaws having an opening therethrough opposite and centered with respect to said seat, a drill guide bushing positioned in said opening and having an end projecting beyond the jaw, said end having a plane face perpendicular to the axis of said bushing, the said plane face of the bushing adapted to cooperate with said seat in clamping and positively locating the work when the jaws are moved relatively toward each other with the work therebetween, a post fixed to one of said jaws and the other of said jaws being slidable along said post, screw means for sliding said jaw along said post and for clamping the work between said bushing and V seat, the said jaw having the V seat being provided with an opening therethrough axially aligned with the opening in the other jaw, the opening in the work seat jaw also being adapted to receive a drill guide bushing.

FRANK McCULLOUGH.

REFERENCES CITED

The following references are of record in the file of this patent:

UNITED STATES PATENTS

| Number | Name | Date |
|---|---|---|
| 800,559 | Edgerton | Sept. 26, 1905 |
| 827,062 | Frain | July 24, 1905 |
| 1,322,978 | Verderber | Nov. 25, 1919 |
| 1,401,262 | Kranz | Dec. 27, 1921 |
| 1,529,557 | Simon | Mar. 10, 1925 |
| 1,805,443 | Walters et al. | May 12, 1931 |
| 1,045,633 | Swainson-Brooke | Nov. 26, 1912 |
| 1,079,143 | Pool | Nov. 18, 1913 |

FOREIGN PATENTS

| Number | Country | Date |
|---|---|---|
| 164,228 | British | June 9, 1921 |
| 3,221 | British | 1910 |
| 366,601 | German | Jan. 5, 1923 |
| 120,790 | British | Nov. 28, 1918 |

OTHER REFERENCES

American Machinist, Nov. 9, 1916, pp. 803–806.
American Machinist, Oct. 11, 1917, p. 623, published by McGraw-Hill Pub. Co., 330 West 42 St., New York, N. Y.